May 3, 1966  A. F. UHLIG  3,249,224
DETECTING CRIZZLES IN HOLLOW GLASS CONTAINERS
Filed Feb. 27, 1963  3 Sheets-Sheet 1

INVENTOR.
ALBERT F. UHLIG
BY
J. R. Nelson
W. A. Schaich
ATTORNEYS

May 3, 1966  A. F. UHLIG  3,249,224
DETECTING CRIZZLES IN HOLLOW GLASS CONTAINERS
Filed Feb. 27, 1963  3 Sheets-Sheet 2

INVENTOR.
ALBERT F. UHLIG
BY J. R. Nelson and
W. A. Schaich
ATTORNEYS

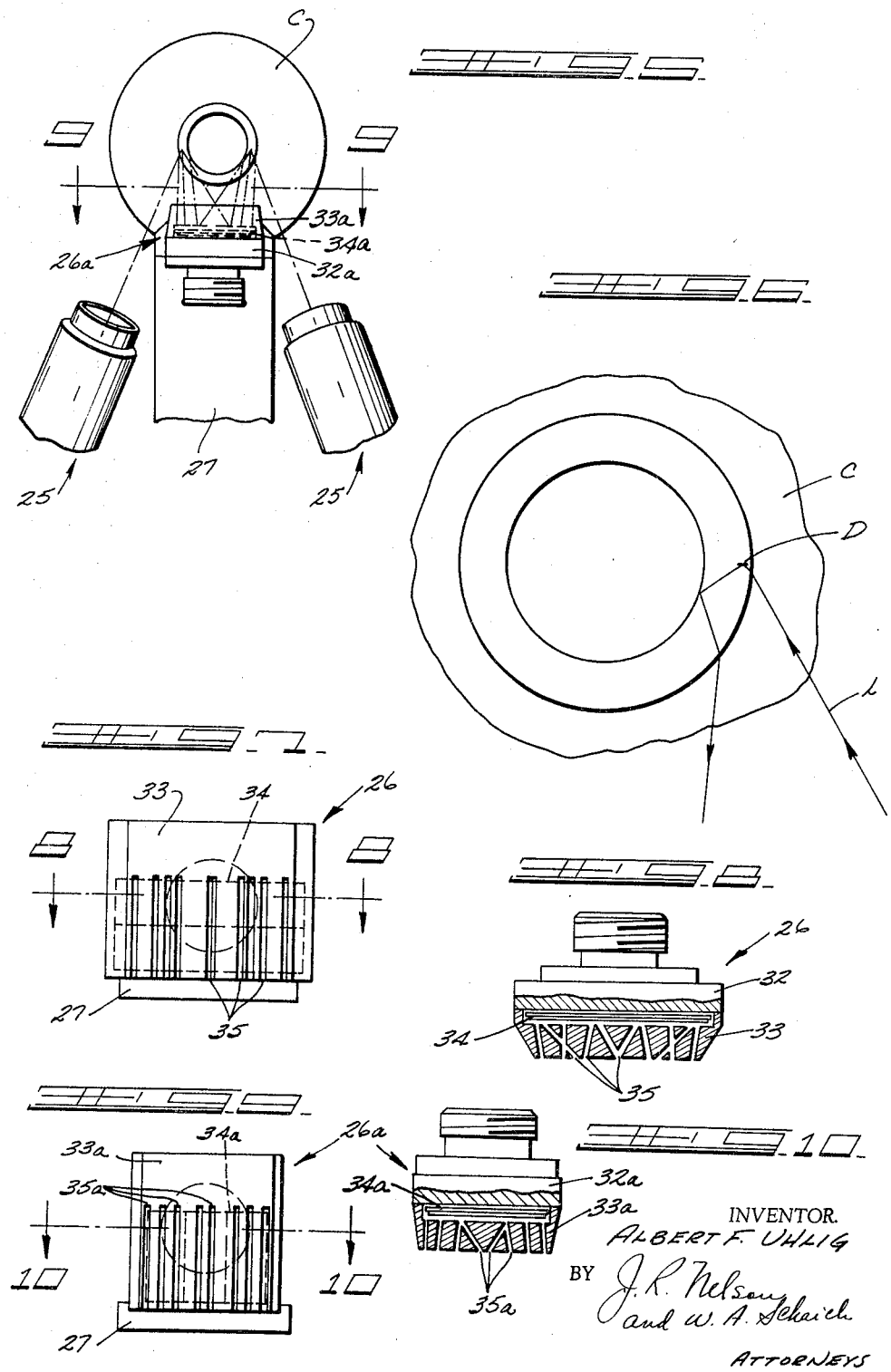

United States Patent Office 3,249,224
Patented May 3, 1966

3,249,224
DETECTING CRIZZLES IN HOLLOW GLASS CONTAINERS
Albert F. Uhlig, Oakland, Calif., assignor to Owens-Illinois Glass Company, a corporation of Ohio
Filed Feb. 27, 1963, Ser. No. 261,453
6 Claims. (Cl. 209—111.7)

This invention relates to the detection of crizzles or similar defects in the finish of hollow glass containers.

It has long been known that crizzles or similar defects, which comprise mirror-like cracks that extend generally radially in the finish of the hollow glass container, are sources of incipient leakage or breakage of the container. Accordingly, it has heretofore been suggested that such defects be detected by directing a light beam at an acute angle to the radial plane against the finish of the container and positioning a cell at an angle of substantially 90 degrees to the beam so that any light reflected by a crizzle will be picked up by the cell to cause a reject signal. It is possible that the crizzles will not be exactly along a radial plane so there is a possibility that the crizzle will not be detected if the crizzle is off the radial plane either vertically or horizontally.

It is therefore an object of this invention to provide a method and apparatus wherein a greater percentage of the crizzles or similar defects are positively detected and the containers are rejected.

It is a further object of the invention to provide such a method and apparatus which will operate efficiently at high speed.

In the drawings:

FIG. 5 is a fragmentary plan view similar to FIG. 2 of a modified form of apparatus.

FIG. 6 is a partly diagrammatic view showing the manner in which a light beam is redirected by a crizzle in the finish of the container.

FIG. 7 is a view taken along the line 7—7 in FIG. 3.

FIG. 8 is a sectional view taken along the line 8—8 in FIG. 7.

FIG. 9 is a view taken along the line 9—9 in FIG. 5.

FIG. 10 is a sectional view taken along the line 10—10 in FIG. 9.

Figure 1:
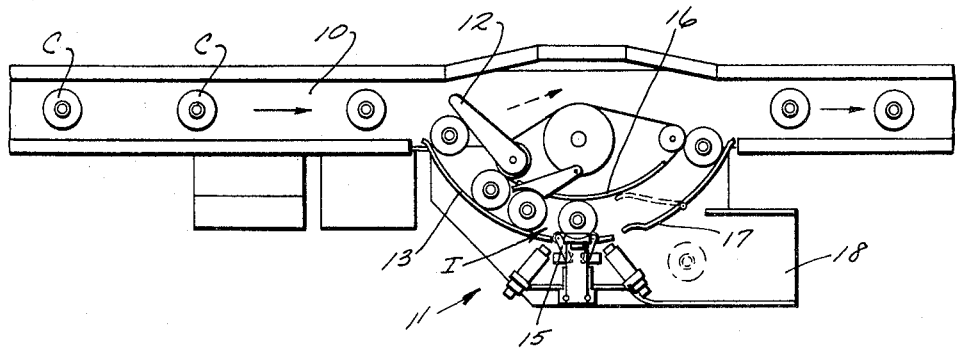
FIG. 1 is a fragmentary plan view of an apparatus embodying the invention.

Referring to FIG. 1, an apparatus for moving a container to an inspecting station is shown and comprises a conveyor 10 which moves the containers C to an inspection station 11. A deflector 12 is provided and may be positioned to guide the containers of the conveyor 10 into the inspection station or to permit the containers to be carried by conveyor 10 as shown by the dotted arrow to by-pass the inspection station 11. As the containers are moved into the inspection station 11, they are moved by an endless belt 16 and guided by guide rails 13 on a plate to an inspecting position I where a holding device 15 is operated to retain each container against endless belt 16 so that it can be rotated about its axis by the movement of endless belt 16. Each container is then inspected and if found to contain a defect, a reject deflector 17 is operated so that after the container is released by the holding device 15, it is guided to a reject area 18. The above apparatus is shown and claimed in my copending application Serial No. 95,975, filed March 15, 1961, Patent No. 3,101,848.

Figure 2:
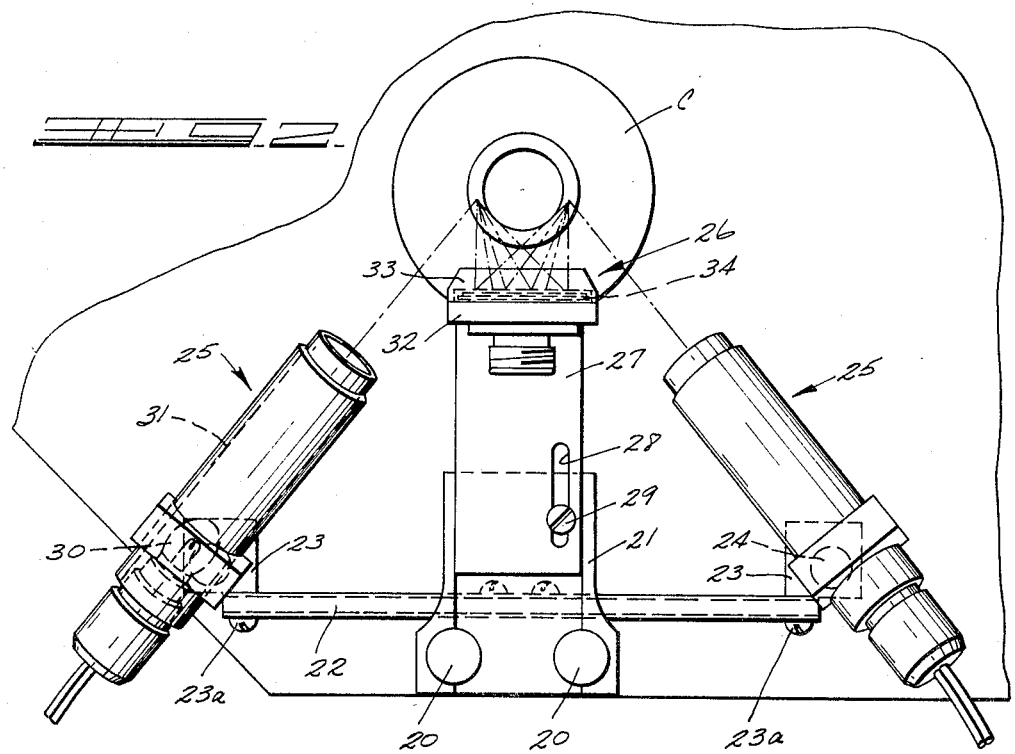
FIG. 2 is a fragmentary plan view on an enlarged scale of a portion of the apparatus shown in FIG. 1.
Figure 3:
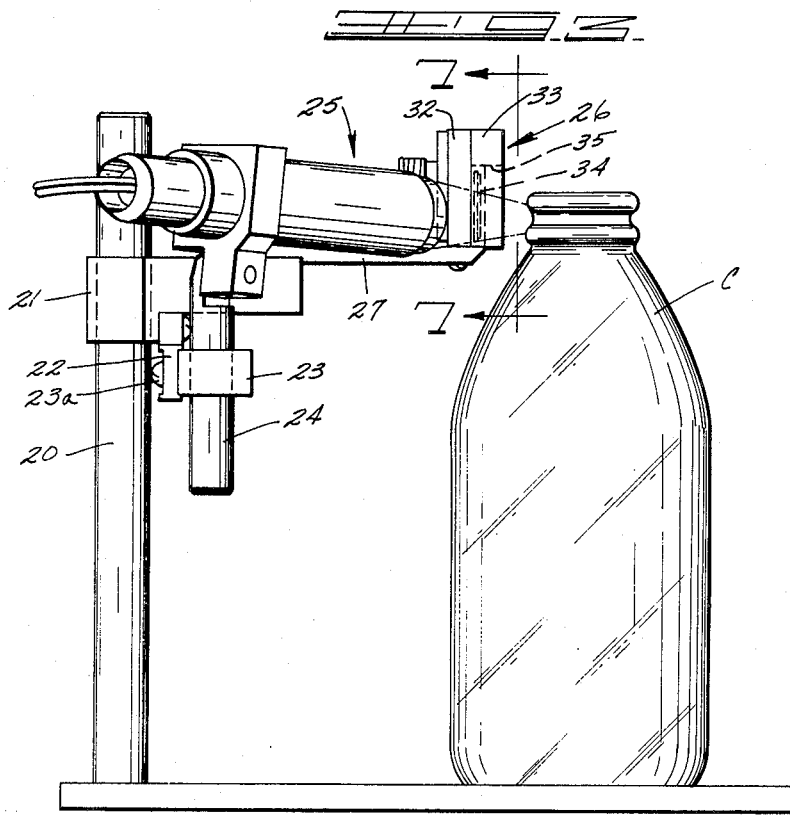
FIG. 3 is a side elevational view of the apparatus shown in FIG. 2 from the right side of FIG. 2.
Figure 4:
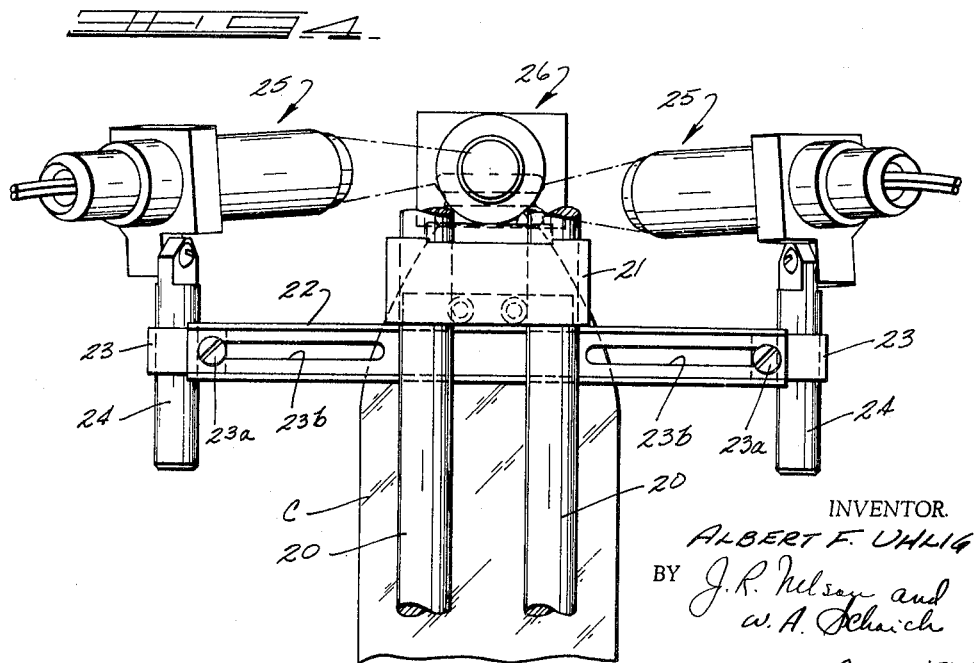
FIG. 4 is a front elevational view of the apparatus shown in FIG. 2.

The present invention relates to the specific inspecting device at the inspecting station I. As shown in FIGS. 2–4, the apparatus comprises a pair of upright posts 20 on which a gauge support bracket 21 is vertically adjustably positioned. Bracket 21 supports a cross bar 22. Brackets 23 are axially adjustably mounted on the ends of the cross bar 22 and held in position thereon by screws 23a extending through slots 23b. Each bracket 23 clamps a rod 24 in vertically adjusted position. A light assembly 25 is pivoted on the upper end of each rod 24.

A light sensitive cell assembly 26 is positioned on a mounting plate 27 which is adjustable horizontally on the bracket 21 by an arrangement which includes a slot 28 in the plate 27 and a screw 29 extending through the slot and threaded into the bracket 21.

The bracket 21 can be moved vertically on the post 20 to adjust the light assemblies 25 and cell assembly 26 vertically. Each light assembly 25 can be adjusted horizontally on cross bar 22 by loosening the screws 23a and moving the brackets 23 along the cross bar 22. This adjusts the horizontal angular relationship of the light beam to the container C and the cell assembly 26. Each light assembly 25 can be adjusted vertically on the cross arm 22 by moving rod 24 in bracket 23. Each light assembly 25 can be tilted relative to its rod 24 to adjust the vertical angular relationship of the light beam relative to the container C. In addition, the light sensitive cell assembly 26 can be adjusted horizontally which provides radial adjustment relative to the container C which is to be inspected.

In accordance with the invention, each lamp housing is provided with a lamp 30 and lens assembly 31 so that the beam of light from the lamp is directed and focused in a spot on the finish of the container, the spot preferably being rectangular with its greatest dimension extending vertically.

As shown in FIGS. 7 and 8, the light sensitive cell assembly 26 comprises a housing 32 and a cover 33. A cell unit 34 is positioned on the housing 32 and comprises a plurality of silicon solar cells which are soldered to a Kovar base and are wired in parallel to form a single substantially flat cell unit having an exposure area which is substantially equal in width to the width of the finish of the container and greater in height than the vertical extent of the container. The cover 33 is formed with a plurality of straight vertical slots 35. As shown in FIGS. 3, 7 and 8, some of the slots 35 form an acute angle with one of the beams and others of the slots form an acute angle with the other of said beams and some of the slots intersect others of the slots. The slots 35 thereby define narrow vertical paths for deflected portions of the beam. In this manner, the cover 33 permits passage of the deflected portions of the beams but restricts the passage of other undesirable light from the vicinity of the inspecting area to the cell unit.

In accordance with the invention, the light sensitive cell assembly is positioned in close proximity to the finish. The lamp housings are adjusted in such a manner as shown in FIG. 4 that the light beams are angularly related vertically to one another. Preferably, one of the light beams extends at an angle of five degrees above the horizontal to the finish and the other of the light beams extends at an angle of five degrees below the horizontal to the finish.

Further, in accordance with the invention, in inspecting containers having a finish of one inch or greater, the horizontal angle between the light beams is preferably approximately 80 degrees or plus or minus 40 degrees on each side of a radial plane through the container and at a right angle to the plane of the cell unit 34. Where the finish of the container is one inch or less, the cell unit 34a is made correspondingly smaller in width and height as shown in FIGS. 5 and 9 and the angle between the light beams is smaller on the order of approximately 45 degrees or plus or minus 22½ degrees on each side of a radial plane through the container and at a right angle to the cell unit 34a.

In operation, when a container C has been moved to the inspecting station and is rotated about its axis, the light beams are caused to scan the finish of the container. If a defect is found as shown, for example, in FIG. 6 by the generally radial defect D, the light beam L will be reflected by the defect and refracted from the interior finish toward the cell unit. If a defect is such that one light beam does not pick it up, then the other light beam will probably be redirected to cause a reject signal.

It has been found that with the apparatus shown, it is possible to accurately and positively reject containers having crizzles which deviate from the radial plane both horizontally and vertically as much as 8 degrees or more. The close proximity of the plane of the cell unit 34 combined with the plurality of slots 35 insures accuracy without false signal.

I claim:

1. An apparatus for detecting crizzles and similar defects in the finish of hollow glass containers which comprises
   means for supporting and rotating said container about its axis,
   means for directing a first beam at a first point on the finish of the container at an acute angle to a radial plane thereof,
   means for directing a second beam at a second point spaced from the first point on the finish of the container at an acute angle to a radial plane,
   said first and second beams being at an acute angle to one another and at an acute angle vertically to one another,
   light sensitive cell means positioned in close proximity to the finish of the container between the beams,
   said cell means comprising a plurality of solar cells connected in parallel and defining a substantially flat light sensitive contact surface positioned with its plane at substantially a right angle to a radial plane of the container,
   said light sensitive contact surface having a width at least equal to substantially the width of the finish of the container,
   means responsive to the energization of said cell means for causing a reject signal,
   means positioned between said finish and said cell means for providing a plurality of distinct paths for the reflected portion of the light from the finish to the cell,
   said last mentioned means comprising a housing member provided with slots having a cross-sectional dimension substantially less than the length thereof.

2. The combination set forth in claim 1 wherein said slots are straight.

3. The combination set forth in claim 2 wherein some of said slots on one side of said housing form an acute angle with one beam and said slots at the other side of said housing form an acute angle with the other said beam.

4. An apparatus for detecting crizzles and similar defects in the finish of hollow glass containers which comprises
   means for supporting and rotating said container about its axis,
   means for directing a first beam at a first point on the finish of the container at an acute angle to a radial plane thereof,
   means for directing a second beam at a second point spaced from the first point on the finish of the container at an acute angle to a radial plane,
   said first and second beams being at an acute angle to one another and at an angle vertically to one another,
   light sensitive cell means positioned in close proximity to the finish of the container between the beams,
   said cell means comprising a plurality of solar cells connected in parallel and defining a substantially flat light sensitive contact surface positioned with its plane at substantially a right angle to a radial plane of the container,
   said light sensitive contact surface having a width at least equal to substantially the width of the finish of the container,
   and a housing positioned between said cell means and said finish and comprising a plurality of straight slots generally parallel to the axis of the container,
   some of said slots forming an acute angle to one of said beams and others of said slots forming an acute angle with the other of said beams,
   some of said slots intersecting others of said slots,
   and means responsive to the energization of said cell means for causing a reject signal.

5. An apparatus for detecting crizzles and similar defects in the finish of hollow glass containers which comprises
   means for supporting and rotating said container about its axis,
   means for directing and focusing a first beam in a rectangular spot at a first point on the finish of the container at an acute angle to a radial plane thereof,
   means for directing and focusing a second beam in a rectangular spot at a second point spaced from the first point on the finish of the container at an acute angle to a radial plane,
   said first and second beams being at an acute angle to one another and at an acute angle vertically to one another,
   light sensitive cell means positioned in close proximity to the finish of the container between the beams,
   said cell means having a light sensitive contact surface at least equal in width to substantially the width of the finish of the container,
   and means responsive to the energization of said cell means for causing a reject signal.

6. An apparatus for detecting crizzles and similar defects in the finish of hollow glass containers which comprises
   means for supporting and rotating said container about its axis,
   means for directing and focusing a first beam in a rectangular spot at a first point on the finish of the container at an acute angle to a radial plane thereof,
   means for directing and focusing a second beam in a rectangular spot at a second point spaced from the first point on the finish of the container at an acute angle to a radial plane,
   said first and second beams being at an acute angle to one another and at an angle vertically to one another,
   light sensitive cell means positioned in close proximity to the finish of the container between the beams,
   said cell means comprising a plurality of solar cells connected to parallel and defining a substantially flat light sensitive contact surface positioned with its plane at substantially a right angle to a radial plane of the container,
   said light sensitive contact surface having a width at least equal to substantially the width of the finish of the container, and a housing positioned between said cell means and said finish and comprising a plurality of straight slots generally parallel to the axis of the container and parallel to the major axis of the rectangular spot,
some of said slots forming an acute angle to one of said beams and others of said slots forming an acute angle with the other of said beams,
some of said slots intersecting others of said slots,
and means responsive to the energization of said cell means for causing a reject signal.

References Cited by the Examiner

UNITED STATES PATENTS

| | | | |
|---|---|---|---|
| 2,902,151 | 9/1959 | Miles | 209—111.5 |
| 2,922,893 | 1/1960 | Ett. | |
| 3,069,553 | 12/1962 | Zoltanski. | |
| 3,089,594 | 5/1963 | Early | 209—111.5 |

ROBERT B. REEVES, *Primary Examiner.*